United States Patent
Ascherin et al.

[11] Patent Number: 5,762,297
[45] Date of Patent: Jun. 9, 1998

[54] RECOVERY DEVICE FOR USE IN AN AIRBORNE VEHICLE

[75] Inventors: Terry C. Ascherin, Yorba Linda; H. Russell Anderson, Sierra Madre, both of Calif.

[73] Assignee: Skyhook Rescue Systems, Inc., Yorba Linda, Calif.

[21] Appl. No.: 717,753

[22] Filed: Sep. 23, 1996

[51] Int. Cl.⁶ ............................................ B64D 9/00
[52] U.S. Cl. ............................... 244/137.1; 244/137.4
[58] Field of Search ......................... 244/137.1, 137.4

[56] References Cited

U.S. PATENT DOCUMENTS

| | | | |
|---|---|---|---|
| 2,282,305 | 5/1942 | Bruno | 244/137.4 |
| 2,734,705 | 2/1956 | Robertson | 244/137.4 |
| 2,953,330 | 9/1960 | Lysak | 244/137.1 |
| 2,977,079 | 3/1961 | Calandra | 244/137.1 |
| 3,088,608 | 5/1963 | Theodore | 244/137.1 |
| 3,348,791 | 10/1967 | McKinlay | 244/137.1 |
| 3,805,977 | 4/1974 | Fritzsche et al. | 244/137.1 |
| 4,500,056 | 2/1985 | Della-Moretta | 244/137.4 |
| 4,750,691 | 6/1988 | Hollrock et al. | 244/137.1 |
| 4,858,855 | 8/1989 | Dalbera | 244/137.1 |
| 4,893,767 | 1/1990 | Ferrara et al. | 244/137.1 |
| 5,137,193 | 8/1992 | McDonald | 244/137.1 |
| 5,417,304 | 5/1995 | Kurtgis | 244/137.4 |
| 5,494,240 | 2/1996 | Waugh | 244/137.4 |
| 5,593,113 | 1/1997 | Cox | 244/137.4 |

FOREIGN PATENT DOCUMENTS

| | | | |
|---|---|---|---|
| 1233364 | 5/1971 | United Kingdom | 244/137.1 |

*Primary Examiner*—Karen B. Merritt
*Assistant Examiner*—Douglas Hess

[57] ABSTRACT

A recovery device for use in an airborne vehicle is described. The recovery device includes a base plate, a winch coupled to the base plate, and an anchoring device coupled to the base plate to detachably couple the base plate to the airborne vehicle. A recovery system for a helicopter that has a support arm extending from its exterior fuselage is also described. The recovery system includes a recovery device that is a base plate, a mechanically-operated winch coupled to the base plate, and an anchoring device to detachably couple the base plate to the interior floor of the helicopter. The recovery system further includes a pulley detachably coupled to the support arm and a cord coupled to the winch and extending through the pulley.

13 Claims, 5 Drawing Sheets

RECOVERY DEVICE FOR USE IN AN AIRBORNE VEHICLE

BACKGROUND OF THE INVENTION

1. Field of the Invention

The invention relates generally to the movement of loads from and to airborne vehicles and more particularly to devices and systems for accomplishing the movement from and to these vehicles.

2. Background

Most airplanes and helicopters are manufactured without load-lifting capabilities that would enable such airborne vehicles to raise or lower a load into the vehicle. Nevertheless, helicopters, in particular, are often called upon to raise or lower loads. A common example is a rescue situation wherein an individual, animal or object, is hoisted into the helicopter from the ground or a body of water.

To accomplish load movement tasks, airborne vehicles are equipped with after-market winches. In a helicopter, for example, these winches are attached to the fuselage above an entrance/exit opening so that the load can be raised into the opening or lowered from the opening. Generally, these winches are electrically or hydraulically operated. A dangerous situation occurs when an equipment failure causes the electrical or hydraulic winch to fail.

There is needed a device for raising or lowering a load to or from, respectively, an airborne vehicle that is not subject to the electrical or mechanical failures associated with the electrically- or hydraulically-operated winches. There is also needed a device that can be quickly, easily, and temporarily installed in an airborne vehicle to raise or lower a load into or from the vehicle, respectively, in the event of a failure of an electrically or hydraulically-operated winch.

SUMMARY OF THE INVENTION

The invention relates to a recovery device for use in an airborne vehicle. The recovery device includes a base plate, a winch coupled to the base plate, and an anchoring device coupled to the base plate to detachably couple the base plate to the airborne vehicle. A cord is attached to the winch to raise or lower the load to or from the vehicle. A guide roller assembly may be coupled to the base plate to guide the cord and reduce the amount of friction on the cord that occurs when raising a load with the winch. The anchoring device is preferably detachably coupled to a cargo ring that is generally secured to the interior floor of the airborne vehicle. The recovery device may be quickly and easily coupled to the interior floor of the airborne vehicle to provide a device to raise or lower loads from an airborne vehicle otherwise not equipped with such a device. The recovery device provides an easily installed backup system to the conventional electrically- or hydraulically-operated winch and can be put in service rapidly upon the malfunction of the electrical or hydraulic system.

The invention also relates to a recovery system for a helicopter that has a support arm extending from its exterior fuselage and substantially above an opening. The recovery system includes a recovery device that is a base plate, a mechanically operated winch coupled to the base plate, and an anchoring device to detachably couple the base plate to the interior floor of the helicopter. The recovery system further includes a pulley detachably coupled to the support arm and a cord to raise or lower a load, the cord coupled to the winch and extending through the pulley.

DETAILED DESCRIPTION OF THE INVENTION

Figure 1:
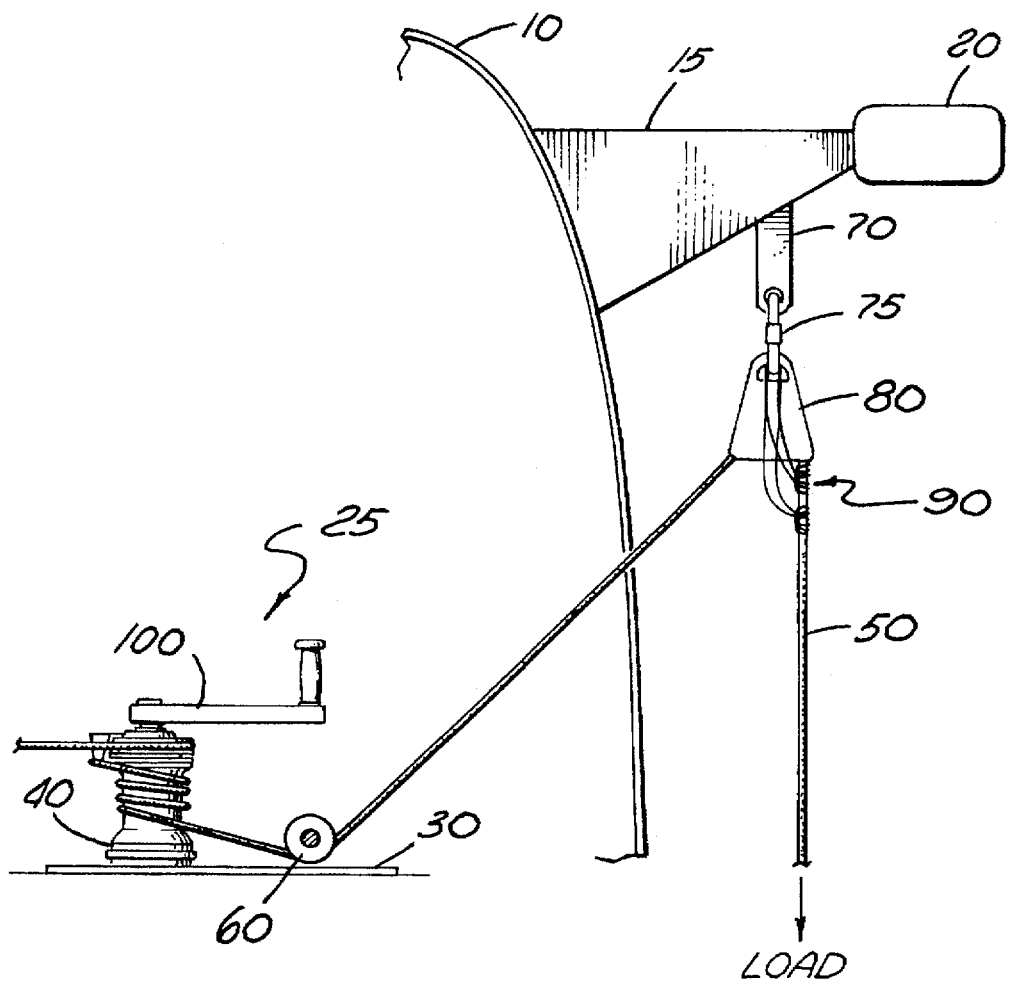
FIG. 1 is a cross sectional side view of a portion of a helicopter illustrating the installation of the recovery device of the invention.

FIG. 1 illustrates the recovery device of the invention as it would be used in a helicopter. FIG. 1 presents a helicopter 10 that is, for example, a Sikorsky-type helicopter. The Sikorsky-type helicopter includes an arm 15 extending outwardly from the side of the helicopter 10, the arm 15 is designed to hold a wind-resistant pod 20. The wind-resistant pod 20 contains, for example, an electric winch that might be commonly installed in a helicopter used for rescue functions.

The recovery device 25 of the invention is detachably coupled to the interior floor of the helicopter. The recovery device 25 includes a manually operated winch 40 with winch handle 100. Wrapped around the winch 40 is a cord 50 that is, for example, a nylon or dacron rope capable of supporting a 10,000 pound load without breaking. The cord 50 extends through a guide roller assembly 60 that is attached to the recovery device. The guide roller assembly 60 serves to guide the cord 50 and reduce the amount of friction on the cord 50 that occurs when raising a load with the winch 40. The cord 50 extends through a pulley 80 attached to the support arm 15. The pulley 80 is preferably a prussick minding pulley. Prussick minding pulleys are well known to persons of ordinary skill in the mountaineering and life saving disciplines. The prussick minding pulley is attached to a hard point 70 on the support arm 15 of the helicopter 10. The prussick minding pulley 80 is preferably attached to the hard point by a caribiner 75, the caribiner 75 allowing a quick and easily installed, detachable connection to the hard point 70. The cord 50 may then be attached to a load to raise or lower the load to or from the helicopter 10, respectively. The system shown in FIG. 1 further includes a second cord tied at one end in the form of a prussick knot. The prussick knot 90 is connected to the cord 50 as the cord extends from the prussick minding pulley 80. The other end of the second cord is tied to the carabiner 75. The prussick knot 90 provides a safety device to keep a load from falling if there is a malfunction or catastrophic failure of the winch 40 or of any part of the recovery device 25. Prussick knots are well known in the art of mountaineering, and, in this system, serve to grip or clamp down on the cord 50 in the event of a malfunction on the winch side of the pulley 80.

FIG. 1 illustrates the use of the recovery device in a system that may quickly and easily be installed in the event of a failure of the electrical winch 20. FIG. 1 shows that the recovery device 25 may be detachably coupled to the interior floor of the helicopter and the pulley system 80 detachably installed with a caribiner 75 to the support arm 15 of the helicopter. Thus, upon the failure of the electric winch 20, the system of the invention can be installed in a matter of moments.

Figure 2:
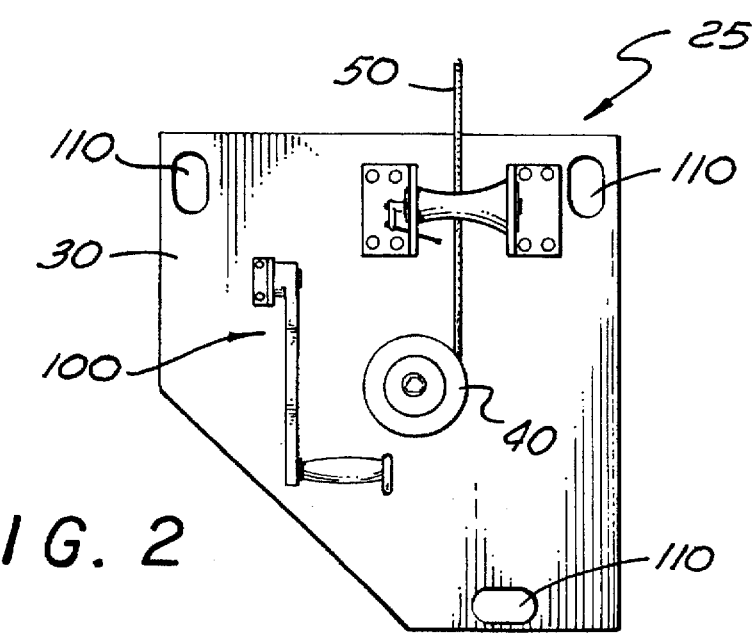
FIG. 2 is a planar top view of the recovery device of the invention.

FIG. 2 illustrates a planar top view of the recovery device 25 of the invention. The recovery device includes a winch 40 coupled to a base plate. The winch 40 is preferably a manually-operated winch 40 as shown in FIG. 2. The winch 40 includes a winch handle 100 that is detachably coupled to the device 25 and thus may be placed on top of the winch 40 to rotate the winch 40 in a circular fashion to raise a load. In FIG. 2, the handle 100 is detachably coupled to the base plate 30 for carrying purposes so that the handle 100 does not protrude from the device 25. In operation, the handle 100 is installed on top of the winch 40. A cord 50 is attached to the winch 40 to raise or lower the load. The recovery device 25 includes a guide roller assembly 60 to guide the cord 50 and reduce the amount of friction on the cord 50 that occurs when raising a load with the winch 40. The cord 50 extends through the guide roller assembly 60. The recovery device 25 further includes several slotted portions 110. The slotted portions are designed to fit over conventional cargo rings that are generally found coupled to the interior floor of airborne vehicles, such as Sikorsky-type helicopters (see FIGS. 9 and 10). As explained in detail below, the recovery device 25 is designed to be placed over the cargo rings with the cargo rings extending through the slotted portions 1 I 0 allowing the device 25 to be secured to the interior floor of the airborne vehicle by coupling the base plate 30 to the cargo rings by, way of an anchoring device.

Figure 3:
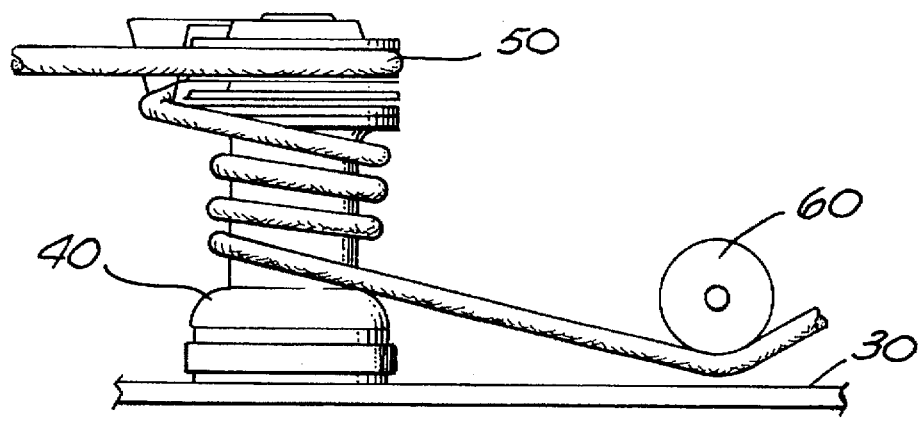
FIG. 3 is a planar side view of a manually-operated winch attached to the recovery device of the invention.

FIG. 3 illustrates a portion of the recovery device 25 of the invention. The portion of the device 25 shown in FIG. 3 illustrates a planar side view of a mechanical winch 40 with a cord 50 wrapped around the winch 40 and extending though the guide roller assembly 60.

Figure 4:
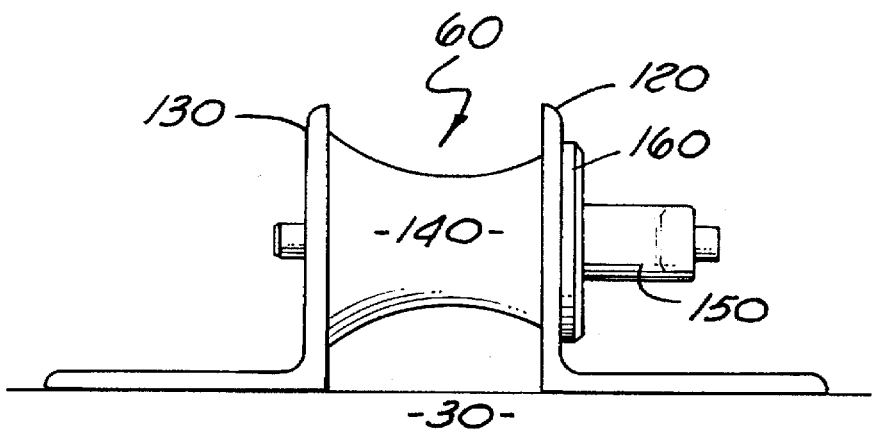
FIG. 4 is a planar side view of the guide roller assembly portion of the claimed recovery device.
Figure 5:
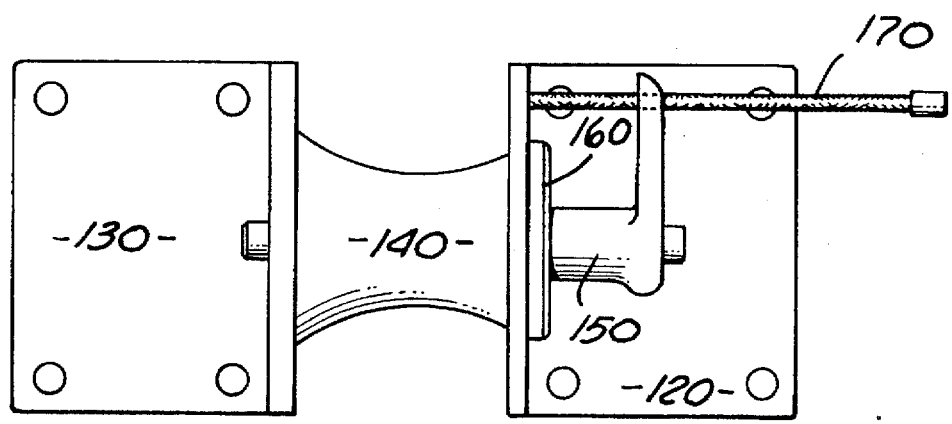
FIG. 5 is a planar top view of the guide roller assembly portion of the recovery device of the invention.
Figure 6:
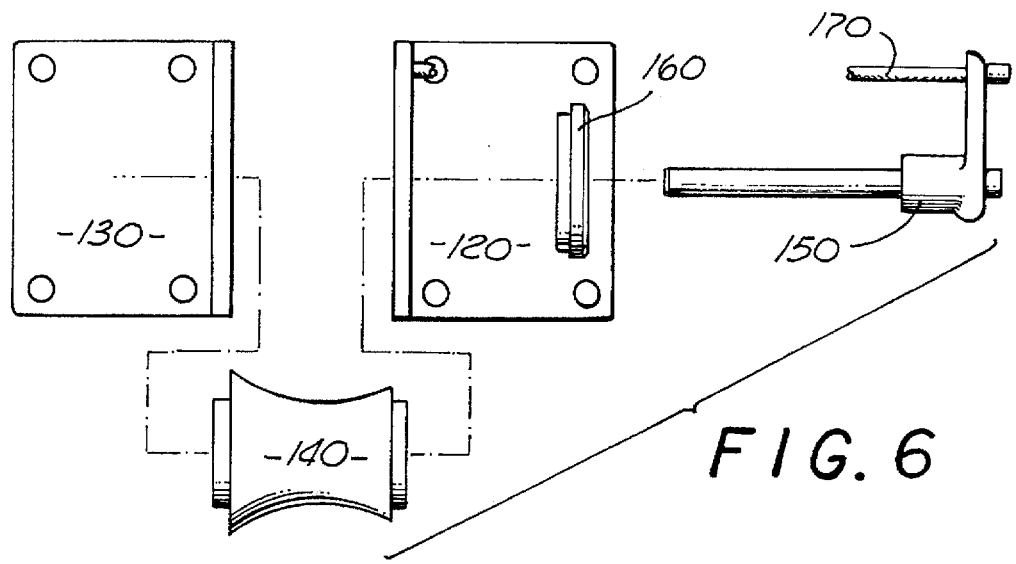
FIG. 6 is an exploded planar top view of the guide roller assembly portion of the recovery device of the invention.
Figure 7:
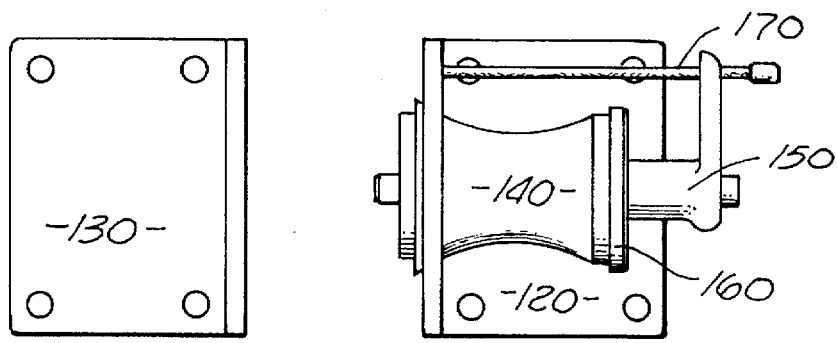
FIG. 7 is a planar top view of the guide roller assembly portion of the recovery device of the invention, wherein the roller portion has been removed from between opposing L-shaped angle supports.
Figure 8:
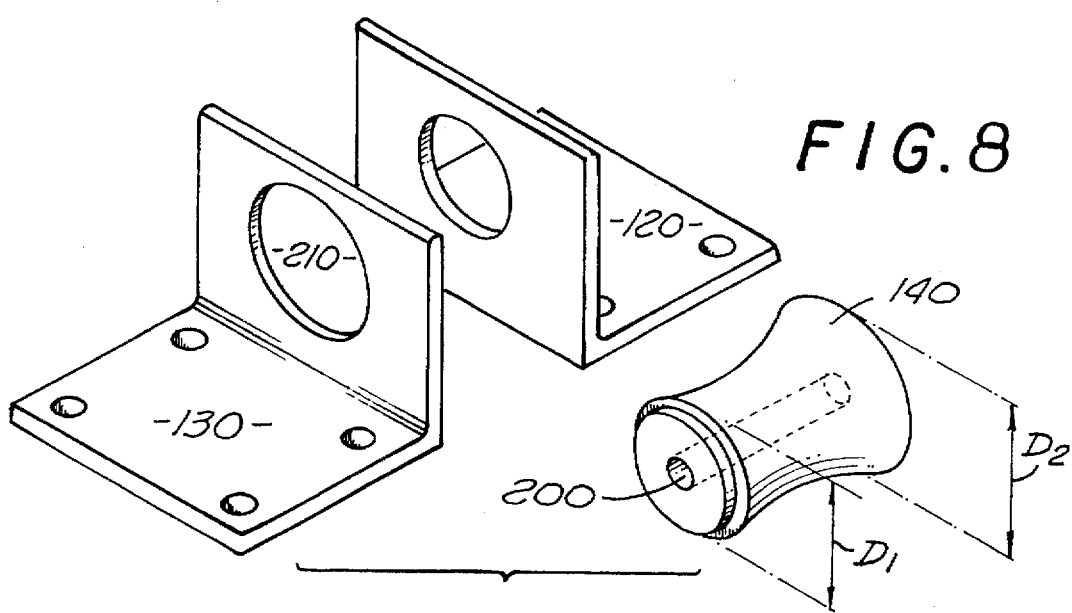
FIG. 8 is a perspective side view of a pair of opposing L-shaped angle supports of the guide roller assembly portion of the recovery device.

FIGS. 4–8 illustrate the guide roller assembly of the invention. FIG. 4 illustrates a planar side view of the guide roller assembly 60 coupled to the recovery device 25. FIG. 5 illustrates a planar top view of the guide roller assembly 60. FIG. 6 illustrates an exploded planar top view of the assembly 60. FIG. 7 illustrates a planar top view of the guide roller assembly in a load position to load a cord. FIG. 8 specifically illustrates the L-shaped angle supports 120 and 130 and the roller 140 of the guide roller assembly 60.

As noted, the guide roller assembly 60 includes a pair of L-shaped angle supports 120 and 130 and a roller 140 between the pair of angle supports. The roller 140 is preferably made of aluminum and has a substantially cylindrical shape with concave sides and an axial hole 200 extending through its length (see FIG. 8). At each end, oil impregnated bronze bushings are located in the axial hole. The diameter of one end of the roller 140 is larger than the diameter of the second end of the roller 140. (In FIG. 8, D1 is greater than D2.) The guide roller assembly 60 further includes a securing rod extending through a hole in L-shaped angle support 120, through the axial hole 200, through roller 140 and through L-shaped angle support 130. The securing rod 150 is preferably a ball lock pin to secure the roller between the pair of angle supports 120 and 130.

The guide roller assembly 60 is designed so that parts will not be lost when the recovery device 25 is installed in an airborne vehicle when in midflight. Thus, as noted, the guide roller assembly 60 is designed so that the roller 140 has a diameter at one end that is greater than the diameter at the other end. (D1 is greater than D2.) The smaller diameter end (D2) of the roller is sized so that it may fit through an opening 210 in L-shaped angle support 120 allowing the roller 140 to be moved out of the path of the cord 50 so that the cord 50 may be put down and the roller 140 placed over the cord in its appropriate position (see FIGS. 7 and 8). As illustrated in FIG. 7, the securing rod 150 is pulled away from L-shaped angle support 130 and toward angle support 120. The roller 140 is also moved toward angle support 120, through opening 210 and out of the path of the cord 50. The other end of roller 140 has a diameter D1 that is larger than the opening 210 in L-shaped angle support 120 so that the roller 140 cannot be completely removed through the opening 210 in the L-shaped angle support 120.

The invention contemplates that the securing rod 150 and the roller 140 may be slid out of the path of the cord 50 to allow the cord 50 to be placed under the guide roller. Once the cord 50 is positioned between the pair of L-shaped angle supports 120 and 130, the roller 140 is positioned over the cord 50 and the securing rod 150 is inserted into the opposite L-shaped angle support 130 securing the guide roller assembly 60. To maintain the roller 140 between the pair of L-shaped angle supports 120 and 130, a preferably aluminum roller flange 160 is positioned between the securing rod 150 and the opening in the L-shaped angle support 120. The roller flange 160 has an exterior diameter that is greater than the opening 210 in the L-shaped angle support 120 so that the roller 140 is secured between the L-shaped angle supports 120 and 130 and does not move through the opening 210 in the L-shaped angle support 120. Finally, the guide roller assembly includes a mechanism to attach the securing rod 150 to the guide roller assembly 60 so that the rod 15 is not lost during assembly of the recox-ery device. Preferably, the mechanism is a small diameter cable 170 coupled to the rod 150 and L-shaped angle support 120. The length of the cable 170 is sufficient to allow the rod 150 to be removed from the path for the cord 50 defined by the opposing L-shaped angle supports 120 and 130.

Figure 9:
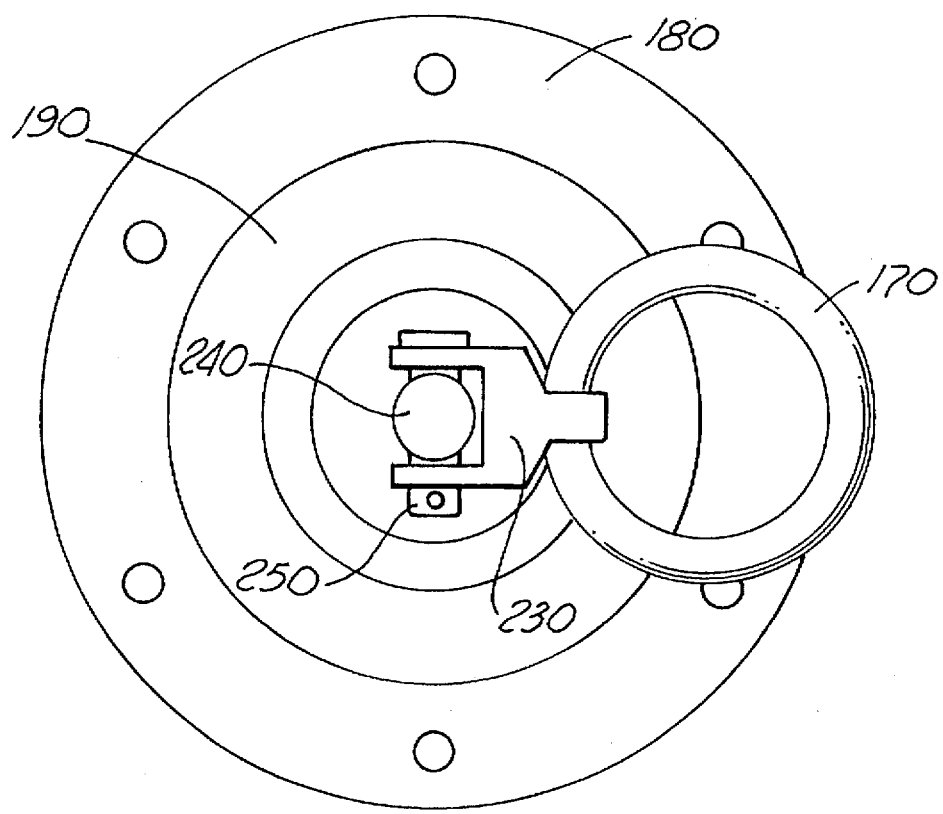
FIG. 9 is a planar top view of a cargo ring assembly typically found in a Sikorsky-type helicopter.
Figure 10:
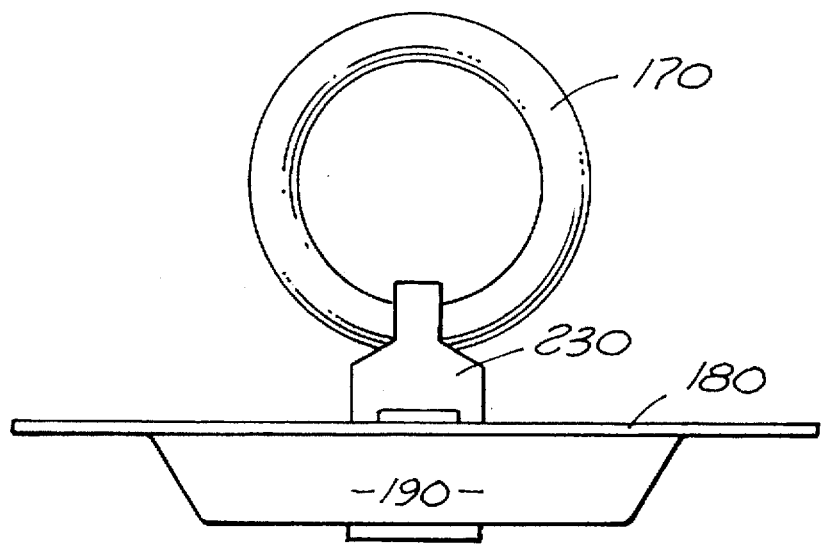
FIG. 10 is a planar side view of a cargo ring assembly typically found in a Sikorsky-type helicopter.
Figure 11:
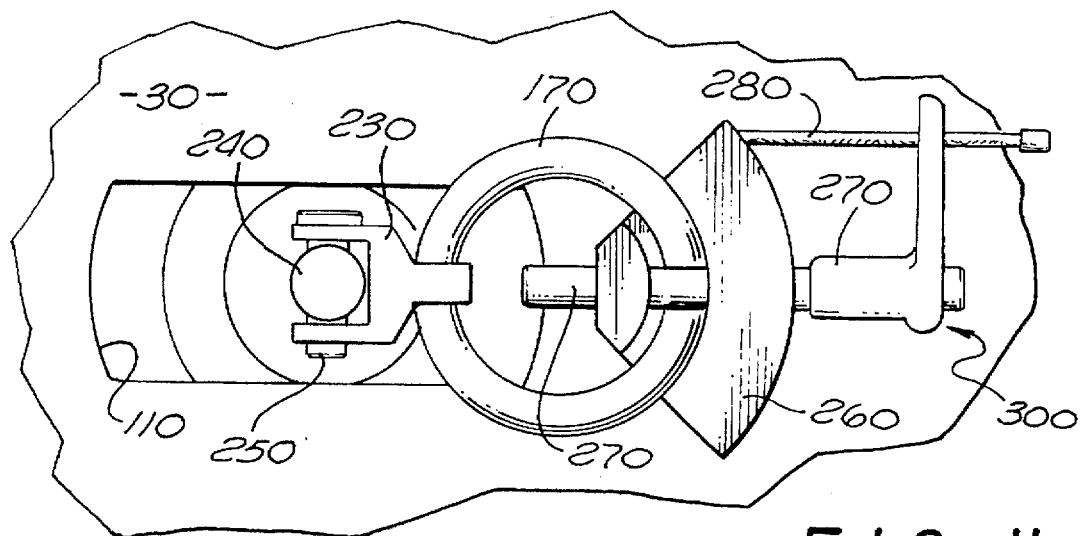
FIG. 11 is a planar top view of the anchoring device portion of the recovery device invention.
Figure 12:
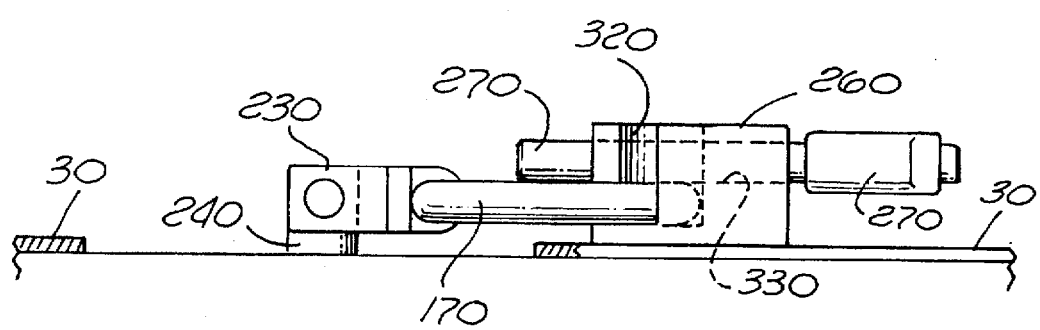
FIG. 12 is a planar side view of the anchoring device portion of the recovery device of the invention.
Figure 13:
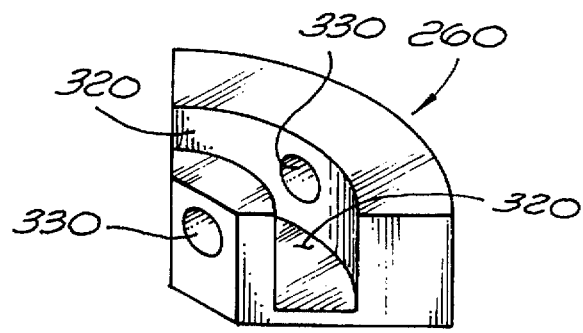
FIG. 13 illustrates a perspective top view of the block portion of the anchoring device portion of the invention.

FIG. 9 illustrates a conventional cargo ring assembly that is found in airborne vehicles, specifically Sikorsky-type helicopters. The cargo ring 170 is connected to an articulated steel clevis 230 that is connected to a shaft 240 that protrudes through a stamped dish 180 recessed into the helicopter floor. A clevis pin 250 secures the ring clevis 230 to anchor shaft 240. FIG. 10 illustrates a planar side view of the cargo ring assembly. FIG. 10 shows a cargo ring 170 coupled to a clevis 230, the cargo ring seated in a stamped dish 180 with a recessed portion 190. This design allows the cargo ring 170 to be raised up and out of the stamped dish 180 and rotated through a full circle or 360° on its axis, FIGS. 11–13 illustrate the anchoring device portion of the recovery device of the invention. FIG. 11 is a planar top view of the anchoring device portion of the invention. FIG. 12 is a planar side view of the anchoring device portion. FIG. 13 is a perspective top view of the block portion of the anchoring device. In FIGS. 11 and 12, a cargo ring 170 extends through a slotted portion 110 in the base plate 30. The diameter of the cargo ring 170 is greater than the width of the slotted portion 110 but less than the length of the slotted portion 110. The cargo ring 170 is placed in an anchoring device 300 that couples to the cargo ring 170 to secure the base plate 30 of the recovery device 25 to the interior floor of the helicopter. The anchoring device 300 consists of a block 260 coupled to the base plate 30. The block 260 has a thickness that is greater than the thickness of a standard cargo ring 170 and is preferably made of aluminum. The block has a slotted portion 320 that substantially conforms to the shape of a portion of the cargo ring 170. The slotted block 260 is secured to the base plate 30 at one end of the slotted portion 110 of the base plate 30 preferably using machine screws. Finally, the block 260 has a hole 330 extending substantially radially through the block 260 and through the slotted portion 320.

The cargo ring 170 is maneuvered through the slotted portion 110 of the base plate 30 of the recovery device 25 and placed in the slotted portion 320 of the block 260. Next, a securing rod 270 is placed through the hole 330 in the block portion 260. The securing rod rests above the cargo ring 170 to hold the cargo ring between the securing rod 270 and the block portion 260. The securing rod is preferably a ball lock pin.

The invention contemplates that there may be several slotted portions 110 in the base plate 30 of the device 25 so that the device 25 may be coupled to the interior floor of the helicopter by several anchoring device portions 300. It is to be appreciated that an anchoring device can be attached to any existing floor-mounted anchor or fastener units by bolting or screwing the base plate to the appropriate fasteners. Helicopters that have a cargo tie-down system with cargo rings 170 as described or a seat-cargo rail system installed will accept the recovery device 25 as described and make that helicopter a hand-powered winch-ready aircraft, The anchoring device preferably includes a mechanism to attach the securing rod 270 to the anchoring device portion 300 so that the rod 270 is not lost during assembly of the recovery device. Preferably, the mechanism is a small diameter cable 280 coupled to the rod 270 and the block portion 260. The length of the cable 280 is sufficient to allow the rod 270 to be removed from the slotted portion 320 so that the cargo ring 170 may be inserted into the slotted portion 320 of the block portion 260.

It is to be appreciated that the invention is not to be limited to the exact details of the construction shown and described. Accordingly, the description and figures should be read in an illustrative rather than a restrictive fashion.

What is claimed is:

1. A portable recovery device for use in an airborne vehicle, the device capable of manual or electrical operation and comprising:

a readily detachable base plate;

a winch coupled to the base plate, the winch to raise or lower a load;

a guide roller assembly coupled to the base plate and configured to guide a cord when raising a load with the cord coupled to the winch, the guide roller assembly laterally spaced from the winch on the base plate and is close proximity to the winch; and an anchoring device coupled to the base plate to detachably couple the base plate to the vehicle.

2. The recovery device of claim 1, wherein the guide roller assembly comprises:

a first L-shaped angle support having a side portion with a first hole having a diameter;

a second L-shaped angle support having a side portion with a second hole having a diameter, wherein the diameter of the second hole is smaller than the diameter of the first hole;

a roller between the first and second angle supports, the roller having a substantially cylindrical shape with concave sides and a first end and a second end and an axial hole, and wherein the diameter of the first end of the roller is larger than the diameter of the second end of the roller;

a roller flange having substantially cylindrical shape and a first end and a second end the first end having a first flange diameter and the second end having a second flange diameter;

and an axial hole wherein the first flange diameter is larger than the second flange diameter, and wherein the second end is detachably engaged in the first hole of the first L-shaped angle support; and a securing rod detachably interposed to the hole of the roller flange and the first hole of the first L-shaped angle support and the hole of the roller and the second L-shaped angle support to secure the roller to the first and second angle supports.

3. The recovery device of claim 2, wherein the securing rod of the guide roller includes a means to couple the securing rod to one of the first and second L-shaped angle supports.

4. The recovery device of claim 2, wherein the securing rod of the guide roller is a ball lock pin.

5. The recovery device of claim 1, wherein the anchoring device is detachably coupled to a cargo ring secured to the interior floor of the airborne vehicle.

6. The recovery device of claim 5, wherein the anchoring device comprises:

a block coupled to the base plate, the block having a thickness that is greater than the thickness of the cargo ring and a slotted portion, wherein the slotted portion of the block has a shape that is substantially similar to a portion of the cargo ring, the block further having a hole extending substantially radially through the slotted portion of the block; and a securing rod detachably extending through the hole, wherein the anchoring device is detachably coupled to the cargo ring when a portion of the cargo ring is positioned in the slotted portion of the block and the securing rod detachably extends through the hole adjacent to the portion of the cargo ring.

7. The recovery device of claim 6, wherein the securing rod of the anchoring device includes a means to couple the securing rod to the block.

8. The recovery device of claim 6, wherein the securing rod is a ball lock pin.

9. A portable recovery system for a helicopter having a support arm extending from the exterior fuselage and substantially above an opening, the recovery system capable of manual or electrical operation and comprising:

a recovery device including a readably detachable base plate, a mechanically operated winch coupled to the base plate, a guide roller assembly coupled to the base plate laterally spaced in close proximity to the winch, and an anchoring device to detachably couple the base plate to the interior floor of the helicopter;

a pulley detachably coupable to the support arm; and a cord to raise or lower a load, the cord configured to be coupled to the winch and extend through the guide roller assembly and the pulley.

10. The system of claim 9, wherein the cord is a first cord, and wherein the pulley is coupable to the support arm by a carabiner, the system further comprising a second cord having a prussick knot is coupled to the carabiner and coupled to the first cord as the first cord extends from the pulley.

11. The system of claim 10, wherein the pulley is a prussick minding pulley.

12. The system of claim 11, wherein the guide roller assembly comprises:

a first L-shaped angle support having a side portion with a first hole having a diameter;

a second L-shaped angle support having a side portion with a second hole having a diameter, wherein the diameter of the second hole is smaller than the diameter of the first hole;

a roller between the first and second angle supports, the roller having a substantially cylindrical shape with concave sides and a first end and a second end and an axial hole, wand wherein the diameter of the first end of the roller is larger than the diameter of the second end of the roller;

a roller flange having substantially cylindrical shape and a first end and a second end, the first end having a first flange diameter and the second end having a second flange diameter, and an axial hole wherein the first flange diameter is larger than the second flange diameter and wherein the second end is detachably engaged in the first hole of the first L-shaped angle support; and a securing rod detachably interposed to the hole of the roller flange and the first hole of the first L-shaped angle support and the hole of the roller and the second L-shaped angle support to secure the roller to the first and second angle supports.

13. The system of claim 12, wherein the anchoring device is detachably coupled to a cargo ring secured to the interior floor of the helicopter, the anchoring device comprising:

a block coupled to the base plate, the block having a thickness that is greater than the thickness of the cargo ring and a slotted portion, wherein the slotted portion of the block has a shape that is substantially similar to a portion of the cargo ring, the block further having a hole extending substantially radially through the slotted portion of the block; and a securing rod detachably extending through the hole, wherein the anchoring device is detachably coupled to the cargo ring when a portion of the cargo ring is positioned in the slotted portion of the block and the securing rod detachably extends through the hole adjacent to the portion of the cargo ring.

* * * * *